United States Patent
Robison et al.

(10) Patent No.: US 11,604,880 B2
(45) Date of Patent: Mar. 14, 2023

(54) SYSTEMS AND METHODS TO CRYPTOGRAPHICALLY VERIFY INFORMATION HANDLING SYSTEM CONFIGURATION

(71) Applicant: DELL PRODUCTS L.P., Round Rock, TX (US)

(72) Inventors: Charles D. Robison, Buford, GA (US); Nicholas D. Grobelny, Austin, TX (US); Amy C. Nelson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 16/800,751

(22) Filed: Feb. 25, 2020

(65) Prior Publication Data

US 2021/0266184 A1     Aug. 26, 2021

(51) Int. Cl.
  *G06F 21/57*     (2013.01)
  *H04L 9/32*     (2006.01)
  (Continued)

(52) U.S. Cl.
  CPC ............ *G06F 21/57* (2013.01); *H04L 9/0897* (2013.01); *H04L 9/3268* (2013.01);
  (Continued)

(58) Field of Classification Search
  CPC ..................................................... G06F 21/57
  See application file for complete search history.

(56) References Cited

U.S. PATENT DOCUMENTS

| | | | |
|---|---|---|---|
| 7,424,610 B2 * | 9/2008 | Ranganathan | G06F 21/6218 726/22 |
| 10,602,353 B1 | 3/2020 | Berdy et al. | |

(Continued)

FOREIGN PATENT DOCUMENTS

| | | |
|---|---|---|
| CA | 3004189 | 6/2017 |
| CN | 102685092 | 9/2012 |

(Continued)

OTHER PUBLICATIONS

Raymond Ng, "Trusted Platform Module TPM Fundamental" APTISS, Aug. 2008. 40 pages.

(Continued)

*Primary Examiner* — Bradley W Holder
(74) *Attorney, Agent, or Firm* — Egan, Enders & Huston LLP.

(57) ABSTRACT

The present disclosure provides various embodiments of systems and related methods to track and cryptographically verify system configuration changes. More specifically, systems and methods are disclosed herein to track an original system configuration of an information handling system (IHS) as the system was built by a manufacturing facility, and any system configuration changes that are made to the original system configuration after the IHS leaves the manufacturing facility. Once a user takes ownership of the IHS, systems and methods disclosed herein may be used to cryptographically verify a current system configuration of the IHS. In doing so, the present disclosure provides a way to authenticate or validate system configuration changes that may occur after the IHS leaves the manufacturing facility.

18 Claims, 7 Drawing Sheets

(51) Int. Cl.
  *H04L 9/40* (2022.01)
  *H04L 9/08* (2006.01)
  *G06F 9/4401* (2018.01)

(52) U.S. Cl.
  CPC ........ *H04L 63/0428* (2013.01); *H04L 63/123* (2013.01); *G06F 9/4401* (2013.01)

(56) References Cited

U.S. PATENT DOCUMENTS

| | | | |
|---|---|---|---|
| 2005/0149733 A1 | 7/2005 | Catherman et al. | |
| 2006/0256107 A1 | 11/2006 | Scarlata et al. | |
| 2010/0235648 A1* | 9/2010 | Hoang | G06F 21/575 713/189 |
| 2010/0241836 A1* | 9/2010 | Proudler | H04L 63/20 713/1 |
| 2013/0014246 A1 | 1/2013 | Larson | |
| 2017/0041147 A1 | 2/2017 | Krahn et al. | |
| 2017/0237560 A1* | 8/2017 | Mueller | H04L 9/30 713/168 |
| 2017/0302459 A1 | 10/2017 | Fenner et al. | |
| 2020/0097661 A1 | 3/2020 | Block | |

FOREIGN PATENT DOCUMENTS

| | | |
|---|---|---|
| CN | 111371726 | 7/2020 |
| TW | 202105208 | 2/2021 |
| WO | 2011139135 | 11/2011 |
| WO | 2013081441 | 6/2013 |
| WO | 2022046074 | 3/2022 |

OTHER PUBLICATIONS

Amy Nelson, "Information Handling System Entitlement Validation", U.S. Appl. No. 16/126,809, filed Sep. 10, 2018, 22 pages.
Robison et al., "Systems and Methods to Cryptographically Verify an Identity of an Information Handling System", U.S. Appl. No. 16/777,415, filed Jan. 30, 2020, 38 pgs.
TCG, "1PM Main Part 1 Design Principles", Revision 116, Mar. 1, 2011, 184 pgs.
TCG, "1PM Main Part 2 TPM Structures", Level 2, Revision 116, Mar. 1, 2011, 201 pgs.
TCG, "TPM Part 3 Commands", Level 2, Revision 116, Mar. 1, 2011, 339 pgs.
TCG, "Trusted Platform Module Library, Part 1: Architecture", Level 00, Revision 01.59, Nov. 8, 2019, 306 pgs.
TCG, "Trusted Platform Module Library, Part 2: Structures", Level 00, Revision 01.59, Nov. 8, 2019, 177 pgs.
TCG, "Trusted Platform Module Library, Part 3: Commands", Level 00, Revision 01.59, Nov. 8, 2019, 432 pgs.
TCG, "Trusted Platform Module Library, Part 3: Commands", Level 00, Revision 01.59, Nov. 8, 2019, 498 pgs.
TCG, "Trusted Platform Module Library, Part 4: Supporting Routines", Level 00, Revision 01.59, Nov. 8, 2019, 146 pgs.
TCG, "Trusted Platform Module Library, Part 4: Supporting Routines", Level 00, Revision 01.59, Nov. 8, 2019, 1009 pgs.
TCG, "Errata for TCG Trusted Platform Module Library", Level 00, revision 01.59, Nov. 8, 2019, 6 pgs.
Jianhong et al., "Protocol for Dynamic Component-Property Attestation in Trusted Computing", Second International Conference on Networks Security, Wireless Communications and Trusted Computing, 2010, 4 pgs.
Liang et al., "The Remote Attestation Design Based on The Identity And Attribute Certificates", IEEE, 2014, 6 pgs.
Wentao et al., "Trusted Remote Attestation Scheme Based on Property", International Conference on Computer Application and System Modeling (ICCASM) 2010, 6 pgs.
Fongen et al.,"The Integration of Trusted Platform Modules Into a Tactical Identity Management System", iEEE Military Communications Conference, 2013, 6 pgs.

* cited by examiner

SYSTEMS AND METHODS TO CRYPTOGRAPHICALLY VERIFY INFORMATION HANDLING SYSTEM CONFIGURATION

FIELD

This invention relates generally to information handling system security, and more particularly, to systems and methods for verifying system configuration.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems (IHSs) include a Trusted Platform Module (TPM) to assure platform integrity, provide secure storage of sensitive information, and perform remote attestation and other cryptographic functions. A TPM can be used to establish a strong root of trust for an IHS by ensuring that the boot process starts from a trusted combination of hardware and software, and continues until the operating system has fully booted and applications are running. In addition to assuring platform integrity, the TPM generates and uses cryptographic keys to verify or attest to the authenticity of various hardware and/or software components contained within the IHS, and to bind and seal data/keys/applications to the system platform. TPM architecture and implementation details are described in the *TPM Main Specification Version* 1.2 (published on Mar. 3, 2011) and the *TPM Library Specification* 2.0 (latest errata version 1.9 released Aug. 23, 2019), the entirety of which are incorporated herein by reference.

As known in the art, a TPM may generally include a microcontroller (or crypto-processor) to generate keys and perform cryptographic functions, persistent memory for storing small amounts of sensitive information (such as cryptographic keys) in a secure location, and versatile memory for storing platform metrics and additional keys. The TPM crypto-processor may generally include a hash generator and encryption-decryption engine to hash large blocks of data, and a key generation engine and random number generator to generate keys that can be used for attestation purposes.

Before an IHS leaves a manufacturing facility, the TPM may be used to generate an Endorsement Key (EK) that can be used to verify the authenticity of the TPM and a Platform Key (PK) that can be used to establish a trust relationship between the platform owner and the boot firmware. Once a user takes ownership, the TPM may be used to generate additional keys, such as an Attestation Key (AK), a Storage Root Key (SRK) and additional storage and signing keys. The AK acts as an alias for the EK and can be used to attest to the validity of the platform's identity and configuration. The SRK provides secure key storage by wrapping (encrypting) keys that may be stored outside of the TPM (e.g., within the system hard drive). Storage keys are generally used to encrypt/decrypt data, providing confidentiality and access control for the data itself. Signing keys are used to encrypt hash digests of data, and provide a means for a verifying party to confirm the integrity of the data (e.g., a message), and thus, confirm the origin of the hashed data.

After an IHS leaves the primary manufacturing facility, it can be modified before and/or after it is received by an end user. System reconfiguration activities can occur at various stages after initial manufacturing is complete. For example, a second manufacturing facility may add or remove hardware or software components to/from the IHS. In some cases, a value-added reseller (VAR) may add customized features to the IHS before the IHS is delivered to an end user. After the end user receives the IHS, system reconfiguration may also occur when malfunctioning components are replaced in the field, when non-failing system returns are rebuilt and returned as refurbished systems, and when system administrators and/or end users make modifications to their systems during normal use. Unfortunately, there is no way to authenticate or validate system configuration changes once an IHS leaves the primary manufacturing facility. As such, there is no way to verify that an IHS, and it's collection of hardware and software components, are correct and trustworthy.

SUMMARY OF THE INVENTION

The following description of various embodiments of systems and related methods is not to be construed in any way as limiting the subject matter of the appended claims.

The present disclosure provides various embodiments of systems and related methods to track and cryptographically verify system configuration changes. More specifically, systems and methods are disclosed herein to track an original system configuration of an information handling system (IHS) as the system was built by a manufacturing facility, and any system configuration changes that are made to the original system configuration after the IHS leaves the manufacturing facility. Once a user takes ownership of the IHS, systems and methods disclosed herein may be used to cryptographically verify a current system configuration of the IHS. In doing so, the present disclosure provides a way to authenticate or validate system configuration changes that may occur after the IHS leaves the manufacturing facility. Additional advantages and improvements provided by the systems and methods disclosed herein will become apparent upon reading this disclosure.

According to one embodiment, a system in accordance with the present invention may include an information handling system (IHS) built by a manufacturing facility according to an original system configuration, a first remote system coupled to the IHS via a network, and a second remote system coupled to the IHS and the first remote system via the network. As described in more detail below, the first remote system may be configured to track the original system configuration of the IHS, and any changes made to the original system configuration after the IHS leaves the manufacturing facility. The second remote system may be configured to verify a current system configuration of the IHS after a user takes ownership of the IHS.

The IHS may generally include a trusted platform module (TPM) and a processing device. The TPM stores a private and public Endorsement Key (EK), a private and public Platform Key (PK) and an EK certificate containing the public EK. The processing device executes program instructions to cryptographically verify the current system configuration of the IHS by communicating with the TPM and the second remote system.

The first remote system may track the original system configuration of the IHS by generating an initial platform attribute (PA) certificate containing information specifying the original system configuration. In one embodiment, the initial PA certificate may include a system identifier that uniquely identifies the IHS and a plurality of component identifiers that identify hardware and/or software components, which were included within the IHS at the manufacturing facility. If a system modifier makes a system configuration change to the original system configuration after the IHS leaves the manufacturing facility the first remote system tracks the system configuration change by generating a supplemental PA certificate containing information specifying the change. In one embodiment, the supplemental PA certificate may include a system identifier that uniquely identifies the IHS and one or more component identifiers that identify hardware and/or software components, which the system modifier added to the IHS after the IHS left the manufacturing facility.

In some embodiments, the system may further include a network portal, which is coupled to the IHS, the first remote system and the second remote system via the network. The EK certificate, the initial PA certificate and the public PK may be provided to the network portal before the IHS leaves the manufacturing facility. If the system modifier makes the system configuration change to the original system configuration after the IHS leaves the manufacturing facility, the supplemental PA certificate and the public PK may be provided to the network portal.

In some embodiments, the IHS may initiate verification of the current system configuration by sending a verification request to the second remote system, where the verification request includes a system identifier that uniquely identifies the IHS. Upon receiving the verification request, the second remote system may use the system identifier to retrieve the EK certificate, the initial PA certificate and the public PK from the network portal, generate a nonce, encrypt the nonce with the public EK obtained from the EK certificate, and send the encrypted nonce to the IHS.

Upon receiving the encrypted nonce from the second remote system, the IHS may decrypt the encrypted nonce using the private EK stored within the TPM, retrieve the current system configuration of the IHS, sign the nonce, the system identifier and the current system configuration using the private PK stored within the TPM, and send a signed message containing the nonce, the system identifier and the current system configuration to the second remote system via the network.

Upon receiving the signed message, the second remote system may verify the nonce, the system identifier and the current system configuration contained within the signed message using the public PK and the initial PA certificate retrieved from the network portal, and send a verification response to the IHS via the network. In some embodiments, the verification response sent to the IHS may confirm that the current system configuration matches the original system configuration if: (a) the nonce contained within the signed message matches the nonce generated by the second remote system; (b) the system identifier contained within the signed message matches the system identifier sent with the verification request; and (c) the current system configuration contained within the signed message matches the original system configuration specified in the initial PA certificate. Conversely, the verification response may inform the IHS that the current system configuration does not match the original system configuration if: (a) the nonce contained within the signed message does not match the nonce generated by the second remote system; or (b) the system identifier contained within the signed message does not match the system identifier sent with the verification request; or (c) the current system configuration contained within the signed message does not match the original system configuration specified in the initial PA certificate.

In some embodiments, the IHS may determine if a supplemental PA certificate was generated for the IHS after the IHS left the manufacturing facility, if the verification response informs the IHS that the current system configuration does not match the original system configuration. If the supplemental PA certificate was generated for the IHS, the IHS may send a second verification request to the second remote system to initiate verification of the system configuration change specified in the supplemental PA certificate. As with the first verification request, the second verification request may include the system identifier that uniquely identifies the IHS.

Upon receiving the second verification request, the second remote system may use the system identifier to retrieve the EK certificate, the supplemental PA certificate and the public PK from the network portal, generate a nonce, encrypt the nonce with the public EK obtained from the EK certificate, and send the encrypted nonce to the IHS.

Upon receiving the encrypted nonce from the second remote system, the IHS may decrypt the encrypted nonce using the private EK stored within the TPM, retrieve the system configuration change, sign the nonce, the system identifier and the system configuration change using the private PK stored within the TPM, and send a signed message containing the nonce, the system identifier and the system configuration change to the second remote system via the network.

Upon receiving the signed message, the second remote system may verify the nonce, the system identifier and the system configuration change contained within the signed message using the public PK and the supplemental PA certificate retrieved from the network portal, and send a verification response to the IHS via the network. In some embodiments, the verification response sent to the IHS may confirm that the system configuration change retrieved by the IHS matches the system configuration change made by the system modifier if: (a) the nonce contained within the signed message matches the nonce generated by the second remote system; (b) the system identifier contained within the signed message matches the system identifier sent with the second verification request; and (c) the system configuration change contained within the signed message matches the system configuration change specified in the supplemental PA certificate. Conversely, the verification response may inform the IHS that the system configuration change retrieved by the IHS does not match the system configuration change made by the system modifier if: (a) the nonce contained within the signed message does not match the nonce generated by the second remote system; or (b) the system identifier contained within the signed message does not match the system identifier sent with the second verification request; or (c) the system configuration change contained within the signed message does not match the system configuration change specified in the supplemental PA certificate.

BRIEF DESCRIPTION OF THE DRAWINGS

Other advantages of the present disclosure will become apparent upon reading the following detailed description and upon reference to the accompanying drawings in which:

FIG. 5B is a process flow diagram for cryptographically verifying system configuration changes While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Figure 1:
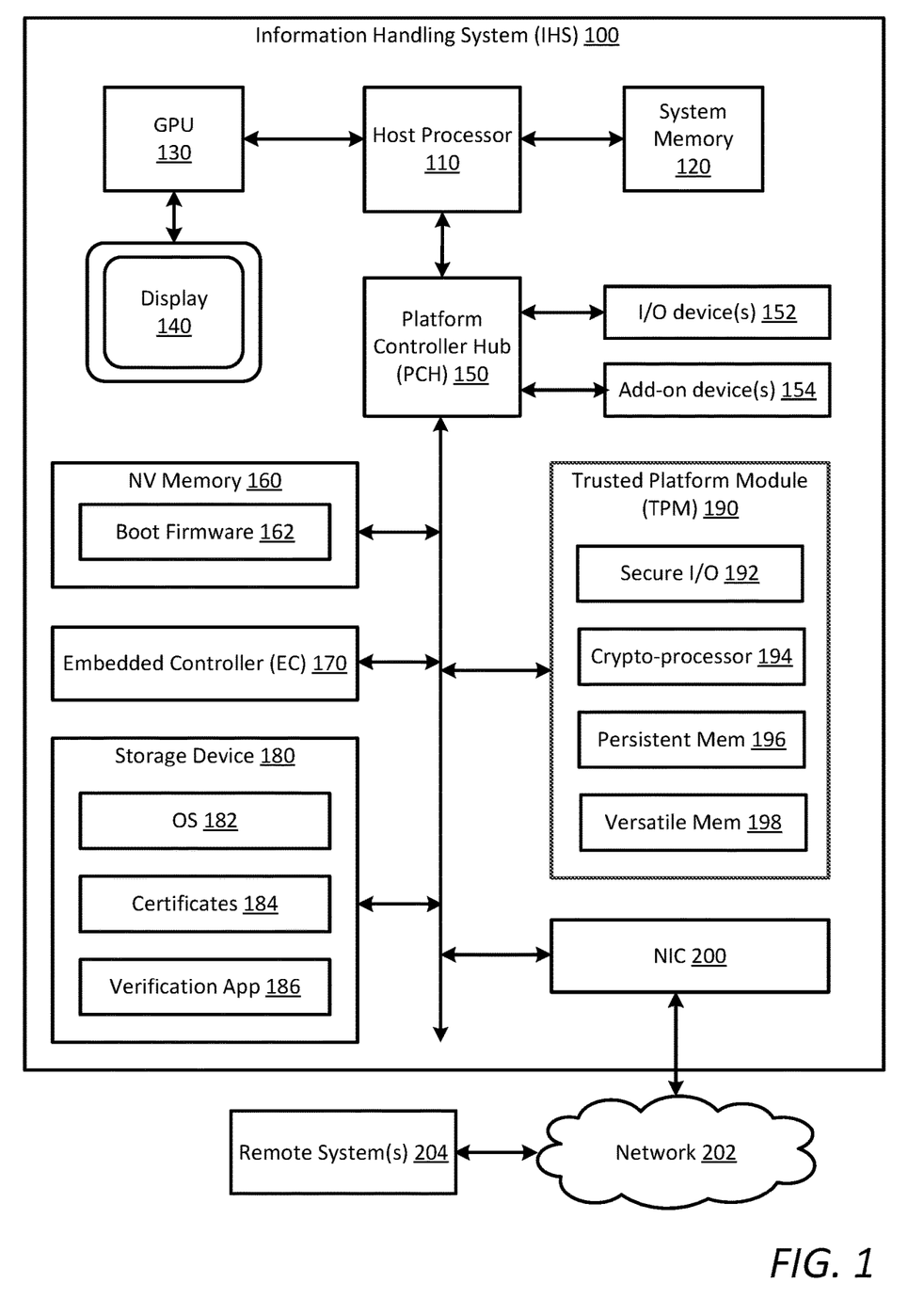
FIG. 1 is a block diagram illustrating one embodiment of an information handling system (IHS) in accordance with the present disclosure.

FIG. 1 is a block diagram of an information handling system 100 (e.g., a desktop computer, laptop computer, tablet computer, server, Internet of Things (IoT) device, etc.) as it may be configured according to one embodiment of the present disclosure. As shown in FIG. 1, IHS 100 includes at least one processing device (e.g., at least one host processor) 110, a system memory 120, a graphics processor unit (GPU) 130, a display device 140, a platform controller hub (PCH) 150, one or more input/output (I/O) devices 152, one or more add-on devices 154, a computer readable non-volatile (NV) memory 160, an embedded controller (EC) 170, a computer readable storage device 180, a Trusted Platform Module (TPM) 190 and a network interface card (NIC) 200.

It is expressly noted that the configuration shown in FIG. 1 is exemplary only, and that the various methods disclosed herein for binding and cryptographically verifying the identity of an information handling system may be implemented on any type and/or configuration of IHS having at least at least one processing device, a computer readable storage device, a TPM and a NIC. It will be further understood that while certain components of an information handling system are shown in FIG. 1 for illustrating embodiments of the present disclosure, the information handling system disclosed herein is not restricted to including only those components shown in FIG. 1 and described below.

Host processor 110 is configured to execute program instructions (or computer program code) for the IHS, and may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 110 may include at least one central processing unit (CPU) having one or more processing cores. As described in more detail below, host processor 110 may execute program instructions (e.g., verification application 186) to cryptographically verify a configuration of the IHS using one or more certificates generated by a remote system and a plurality of keys generated by the TPM 190.

System memory 120 is coupled to host processor 110 and configured to store program instructions (or computer program code), which are executable by host processor 110. System memory 120 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

Graphics processor unit (GPU) 130 is coupled to host processor 110 and configured to coordinate communication between the host processor and one or more display components of the IHS. In the embodiment shown in FIG. 1, GPU 130 is coupled to display device 140 and configured to provide visual images to the user. In some embodiments, IHS 100 may include other types of processing devices including, but not limited to, a graphics-derivative processor (such as a physics/gaming processor), a digital signal processor (DSP), a security processor, and/or a trusted execution environment (such as Intel SGX, Intel TXT, a Global Platform TEE, Intel TXE, Intel CSME, AMD PSP, etc.).

Platform controller hub (PCH) 150 is coupled to host processor 110 and configured to handle I/O operations for the IHS. As such, PCH 150 may include a variety of communication interfaces and ports for communicating with various IHS components, such as input/output (I/O) device(s) 152, add-on device(s) 154, computer readable NV memory 160, EC 170, computer readable storage device 180, TPM 190 and NIC 200. Examples of communication interfaces and ports that may be included within PCH 150 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

I/O device(s) 152 enable the user to interact with IHS 100 and the software/firmware executing thereon. In some embodiments, one or more I/O devices 152 may be provided within IHS 100. In other embodiments, I/O device(s) 152 may be separate from the IHS and may interact with the IHS through a wired or wireless connection. Examples of I/O devices 152 include, but are not limited to, keyboards, keypads, touch screens, mice, scanning devices, voice or optical recognition devices, and any other devices suitable for entering or retrieving data.

Add-on device(s) 154 provide additional functionality to the IHS and may be coupled to one or more of the communication interfaces and ports contained within PCH 150. Examples of add-on devices 154 include, but are not limited to, a video card, sound card, small system computer interface (SCSI) controller, hardware RAID controller, serial/parallel port card, IEEE 1394 cards, Thunderbolt™ card, USB controller card, SATA/eSATA controller card, PS/2 controller card, non-volatile memory card, PCH storage, CPU storage, etc.

Computer readable NV memory 160 is configured to store boot firmware (FW) 162 and other system firmware (not shown), and may include any suitable type of non-volatile memory and/or Flash memory device. Boot firmware 262 may generally include software and/or firmware modules for specifying hardware configuration settings, system date/time, boot sequence, etc., and may be implemented as a Basic Input/Output System (BIOS) and/or a Unified Extensible Firmware Interface (UEFI).

Embedded controller (EC) 170 may be configured to boot the information handling system and perform other functions. EC 170 may generally include read only memory (ROM), random access memory (RAM) and a processing device (e.g., a controller, microcontroller, microprocessor, ASIC, etc.) for executing program instructions stored within its internal ROM and RAM. For example, EC 170 may be configured to execute program instructions (e.g., a boot block) stored within its internal ROM to initiate a boot process for the information handling system.

Each time IHS 100 is powered on or rebooted, an IHS processing device (e.g., host processor 110 and/or EC 170) executes boot firmware 162 to test and initialize IHS hardware components, perform a Power-On Self-Test (POST) to ensure the hardware configuration is valid and working properly, load an operating system (OS) from computer readable storage device 180, and/or perform a variety of other actions known in the art.

Once the OS is loaded and running, an OS application may read a system identifier that uniquely identifies the IHS. This unique system identifier, or "system ID", may be for example a service tag, a product ID, or an Extensible Provisioning Protocol ID (ePPID). In addition to system ID, the OS application may read component identifiers associated with various hardware and/or software components included within the IHS. The component identifiers may be read, for example, from system tables (e.g., SMBIOS or ACPI) or system memory locations. In some cases, component identifier(s) may be read directly from one or more system components, for example, by reading the component identifier(s) from memory mapped I/O, PCI configuration space or other memory locations within the system component(s). Examples of component identifiers include, but are not limited to, a vendor ID (VID), device ID (DID) and serial number (SN). Once read, the OS application may store the system ID and the component identifiers within system tables (e.g., SMBIOS or ACPI) or system memory locations.

Computer readable storage device 180 is configured to store software and/or data, and may include any type of persistent, non-transitory computer readable storage device, such as one or more hard disk drives (HDDs) or solid-state drives (SSDs). For example, computer readable storage device 180 may be configured to store an operating system (OS) 182 for the IHS, in addition to other software and/or firmware modules and user data. As shown in FIG. 1, computer readable storage device 180 may also store certificates 184 and program instructions (e.g., a verification application) 186 that can be executed by host processor 110 to cryptographically verify a current system configuration of the IHS 100 after a user takes ownership of the IHS.

In some embodiments, certificates 184 may include one or more Platform Attribute (PA) certificates, which include system configuration information. For example, an initial PA certificate may be generated for the IHS 100 before the IHS leaves the manufacturing facility. The initial PA certificate includes information specifying the original system configuration of the IHS 100 as built by the manufacturing facility. For example, the initial PA certificate may include a system ID (e.g., a service tag, product ID, or ePPID) that uniquely identifies the IHS, and a plurality of component identifiers (e.g., a vendor ID, device ID, serial number, etc.) that identify the hardware and/or software components, which were included within the IHS at the manufacturing facility.

If a system modifier (e.g., a second manufacturing facility, VAR, administrator, user, etc.) makes system configuration change(s) to the original system configuration after the IHS 100 leaves the manufacturing facility, a supplemental PA certificate is generated for the IHS to track the system configuration change(s). The supplemental PA certificate includes information specifying the system configuration changes that were made to the original system configuration by the system modifier. For example, if a system modifier added a hard drive to the IHS 100 after the IHS left the manufacturing facility, a supplemental PA certificate may be generated for the IHS including the system ID and the component identifier(s) for the new hard drive.

As described in more detail below, initial and supplemental PA certificates may be generated by one or more remote systems 204 (e.g., one or more signing systems 320), which are coupled to the IHS 100 via a network 202. Once a PA certificate is generated by a remote system 204, some embodiments of the present disclosure may transmit the PA certificate back to the IHS 100 for storage (e.g., within certificates 184 of computer readable storage device 180). In some embodiments, the manufacturing facility and system modifier(s) may also maintain PA certificates in local storage, as discussed in more detail below with reference to FIG. 3.

Verification application 186 contains program instructions, which may be executed by host processor 110 to cryptographically verify a current system configuration of the IHS 100 after a user takes ownership of the IHS. As described in more detail below, verification application 186 may send a verification request to one or more remote systems 204 (e.g., one or more verification systems 340) to cryptographically verify a current system configuration of the IHS 100, and may act as an intermediary between the remote system(s) 204 and the TPM 190. Additional details of the verification application 186 are described in more detail below in reference to FIGS. 3, 5A, and 5B.

Trusted Platform Module (TPM) 190 is a tamper-resistant integrated circuit or microcontroller that can be used to assure platform integrity, provide secure storage of sensitive information, and perform remote attestation and other cryptographic functions. TPM 190 establishes a strong root of trust for the IHS by ensuring that the boot process starts from a trusted combination of hardware and software, and continues until the operating system has fully booted and applications are running. In the present disclosure, TPM 190 is also used to cryptographically verify a current system configuration of the IHS 100.

Figure 2:
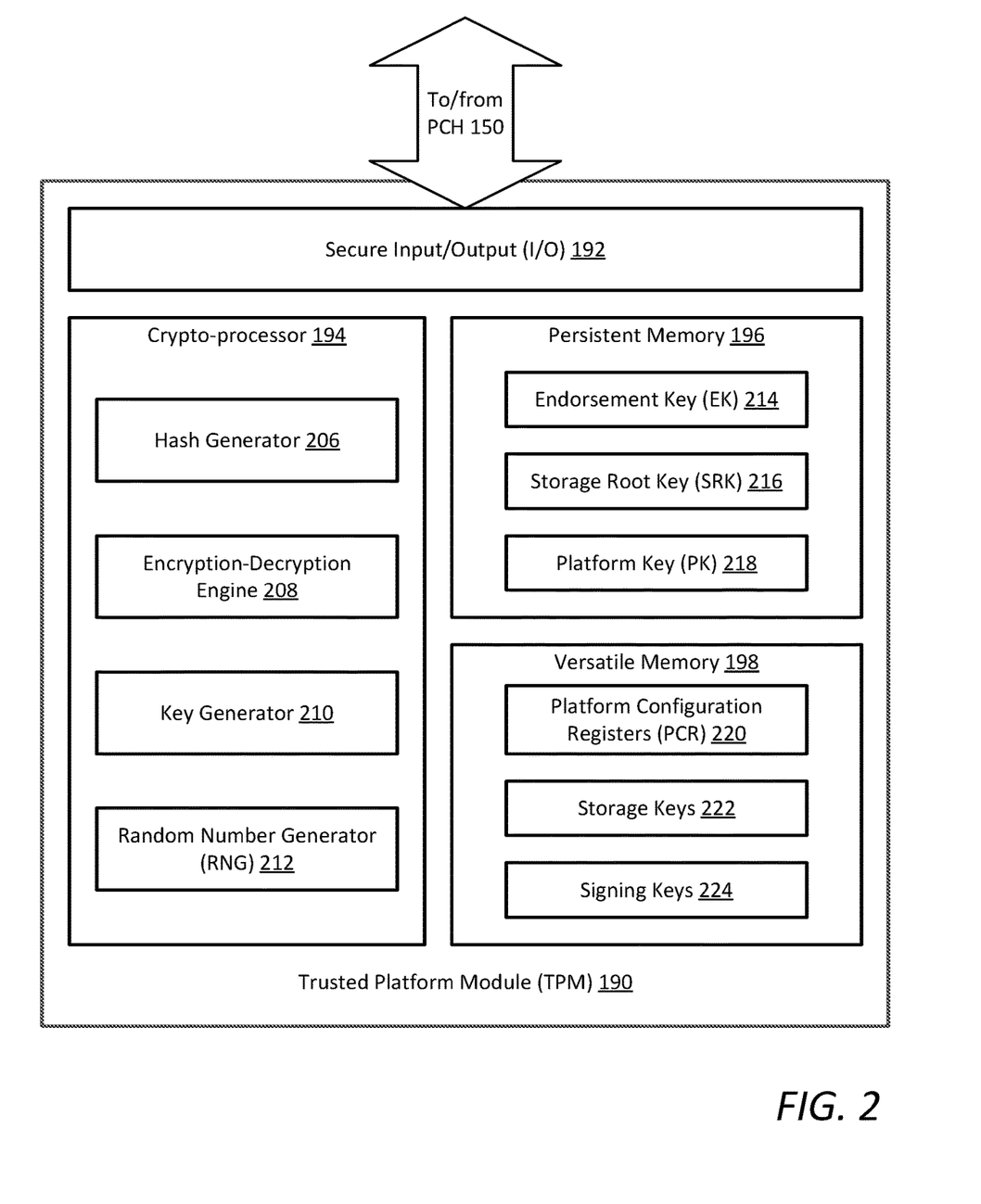
FIG. 2 is a block diagram of a trusted platform module (TPM)

As shown in FIGS. 1 and 2, TPM 190 includes a secure I/O interface 192 for communicating with PCH 150, a crypto-processor 194 for generating keys and performing cryptographic functions, a persistent memory 196 for storing small amounts of sensitive information (such as cryptographic keys) in a secure location, and a versatile memory 198 for storing platform metrics and additional keys. The TPM crypto-processor 194 includes a hash generator 206 to hash large blocks of data, an encryption-decryption engine 208 to encrypt/decrypt data, and a key generator 210 and random number generator 212 to generate a plurality of keys, which may be stored within a secure location of TPM 190 (e.g., within non-volatile memory) and used for attestation purposes.

Persistent memory 196 may store an Endorsement Key (EK) 214, Storage Root Key (SRK) 216 and Platform Key (PK) 218. The EK 214 and PK 218 stored within persistent memory 196 are asymmetric key pairs, each including a public key and private key. While the private EK and the private PK are securely stored within TPM 190, and are never exposed or removed from the TPM, the public EK and the public PK can be read from the TPM.

Versatile memory 198 may store Platform Configuration Registers (PCRs) 220, storage keys 222 and signing keys 224. At each system boot, TPM 190 performs a cryptographic hash of hardware and software configuration settings, which are stored within PCRs 220. In addition, one or more storage keys 222 and/or signing keys 224 may also be generated and stored within versatile memory 198.

NIC 200 enables IHS 100 to communicate with one or more remote systems 204 via network 202. In some embodiments, IHS 100 may utilize NIC 200 and network 202 to communicate with one or more remote systems 204 (e.g., one or more signing systems 320) to track the original system configuration of the IHS and any changes made to the original system configuration after the IHS leaves the manufacturing facility. In addition, IHS 100 may utilize NIC 200 and network 202 to communicate with one or more remote systems 204 (e.g., one or more verification systems 340) to cryptographically verify a current system configuration of the IHS 100.

For purposes of this discussion, network 202 is indicated as a single collective component for simplicity. However, it is appreciated that network 202 may comprise one or more direct connections to other remote systems, as well as a more complex set of interconnections as can exist within a wide area network, such as the Internet. For example, network 202 may be a local area network (LAN), wide area network (WAN), personal area network (PAN), or the like, and the connection to and/or between IHS 100 and network 202 may be wired, wireless or a combination thereof.

In some embodiments, IHS 100 may communicate with the one or more remote systems 204 via a network portal 330, as shown in FIGS. 3-5B. The network portal 330 may be implemented as a web-based API, such as REST, over a protocol such as HTTP/HTTPS, or with other network protocols such as TLS, SSL, etc. The network portal 330 provides a communication channel between the signing system(s) 320, verification system(s) 340, and IHS 100.

As noted above, an information handling system can be modified by various system modifiers (e.g., a second manufacturing facility, a VAR, an administrator, an end user, etc.) after it leaves the manufacturing facility. Prior to the present disclosure, there was no way to authenticate or validate system configuration changes that occur after an IHS leaves the manufacturing facility, and thus, no way to verify that an IHS, and it's collection of hardware and software components, are correct and trustworthy.

To overcome this problem, the present disclosure provides various embodiments of systems and related methods to track and cryptographically verify system configuration changes. More specifically, systems and methods are disclosed to track an original system configuration of the IHS, as the system was built by a manufacturing facility, and any system configuration changes that are made to the original system configuration after the IHS leaves the manufacturing facility. Once a user takes ownership of the IHS, the systems and methods disclosed herein may be used to cryptographically verify a current system configuration of the IHS. In doing so, the present disclosure provides a way to authenticate or validate system configuration changes that may occur after the IHS leaves the manufacturing facility.

Figure 3:
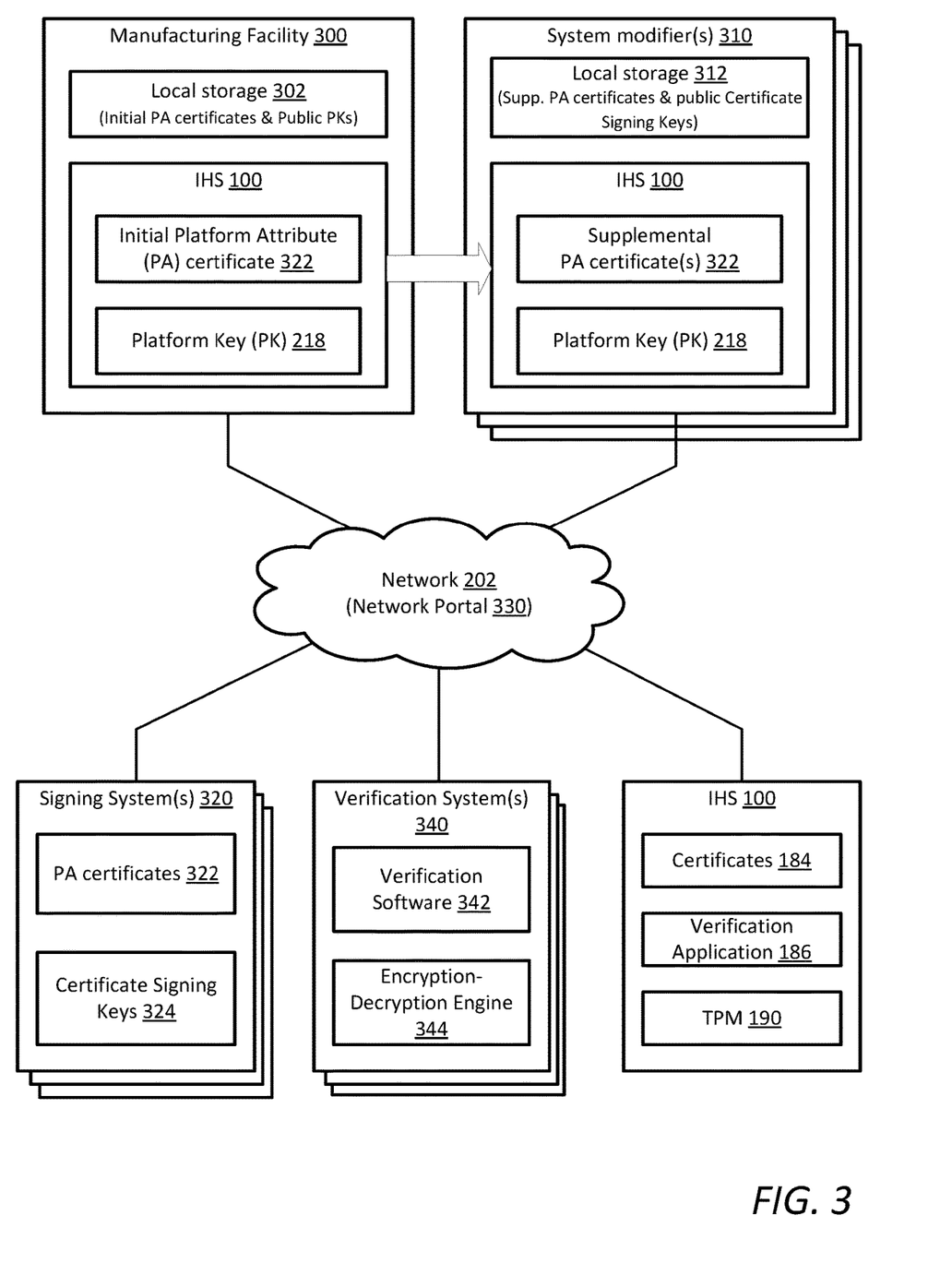
FIG. 3 is a block diagram illustrating one embodiment of a system that may be used to track and cryptographically verify system configuration and system configuration changes.
Figure 4A:
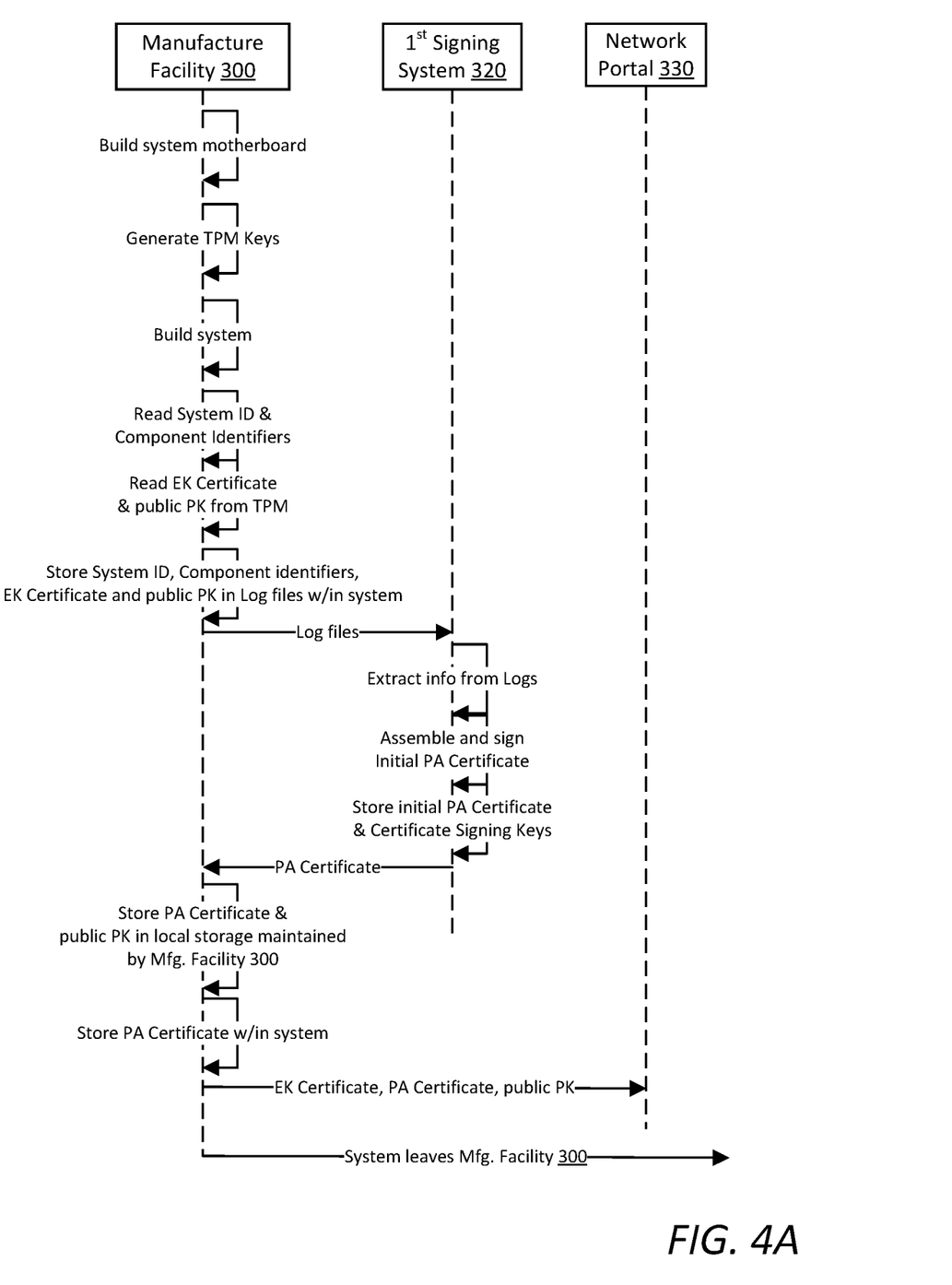
FIG. 4A is a process flow diagram for tracking an original system configuration of an IHS.
Figure 4B:
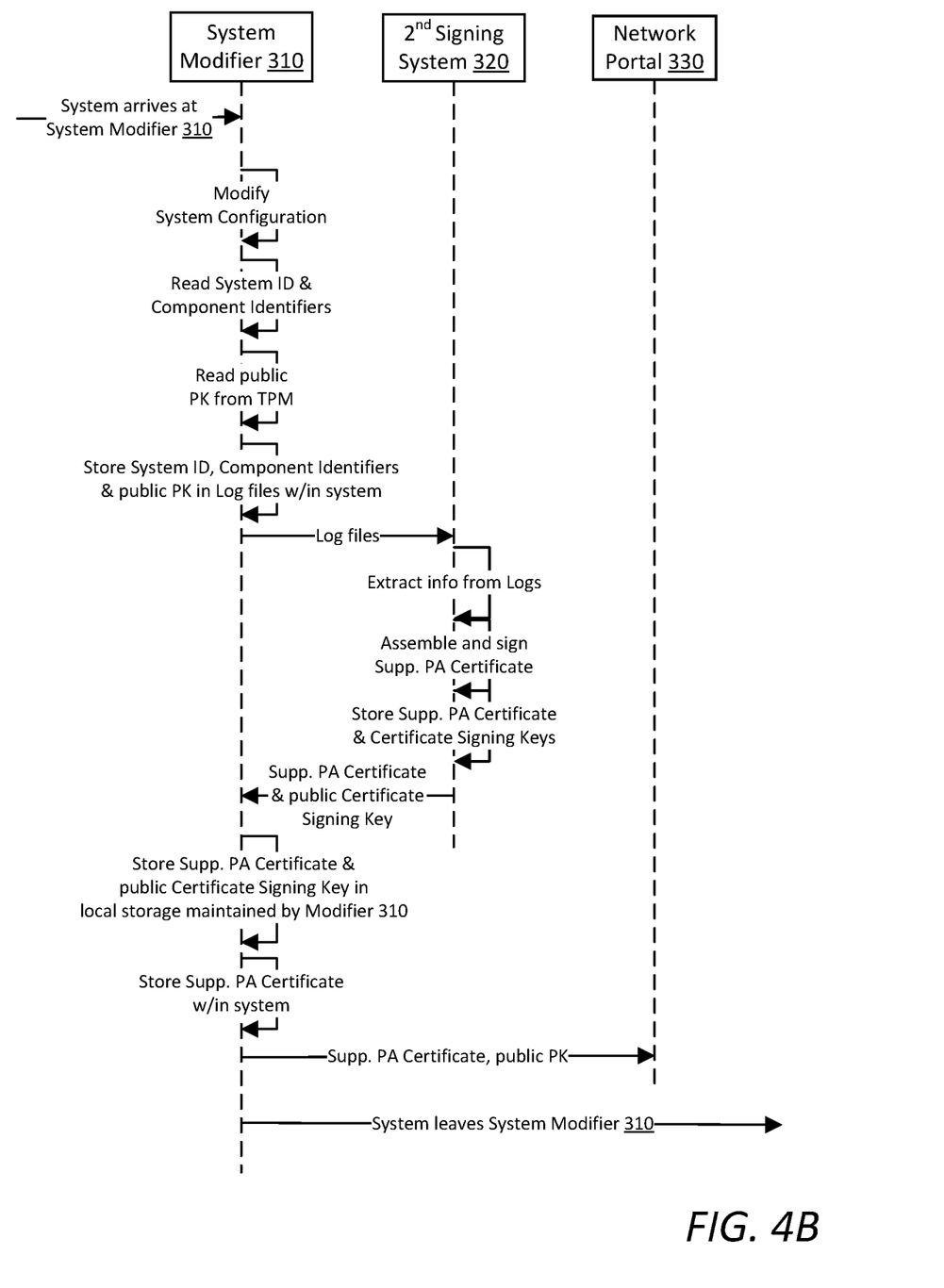
FIG. 4B is a process flow diagram for tracking system configuration changes made to the original system configuration.
Figure 5A:
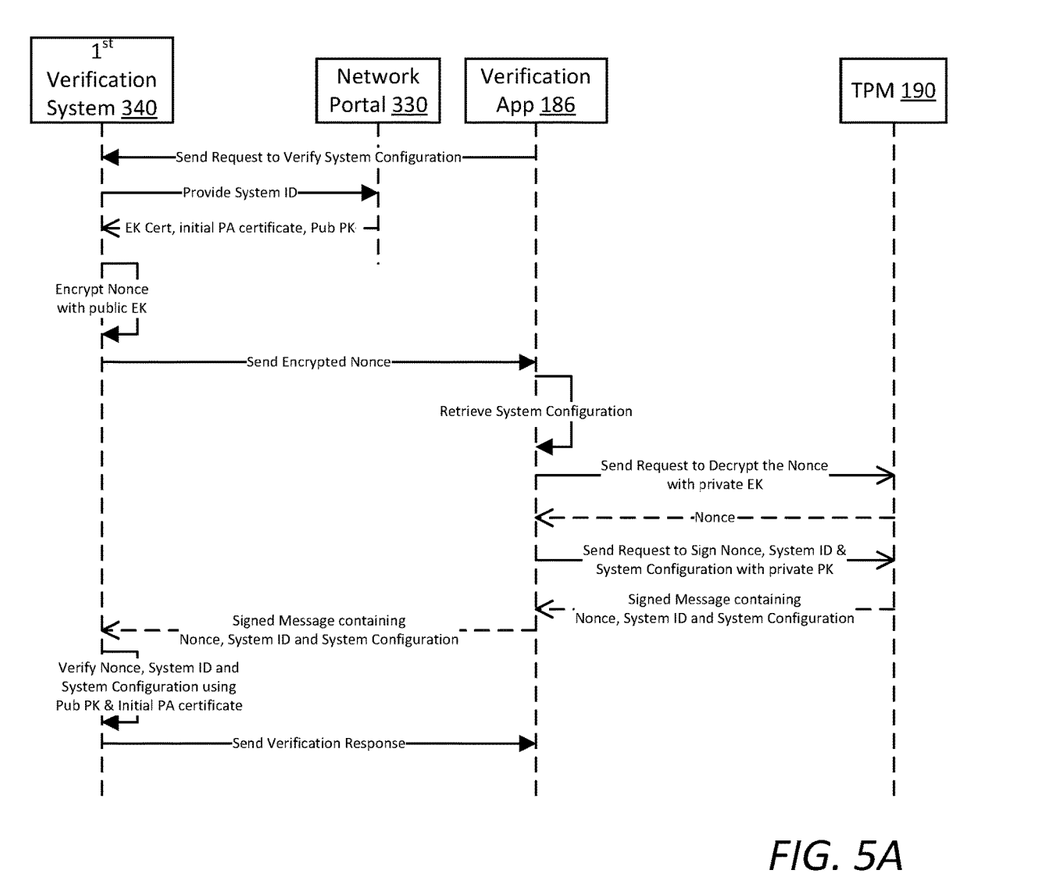
FIG. 5A is a process flow diagram for cryptographically verifying the original system configuration.
Figure 5B:
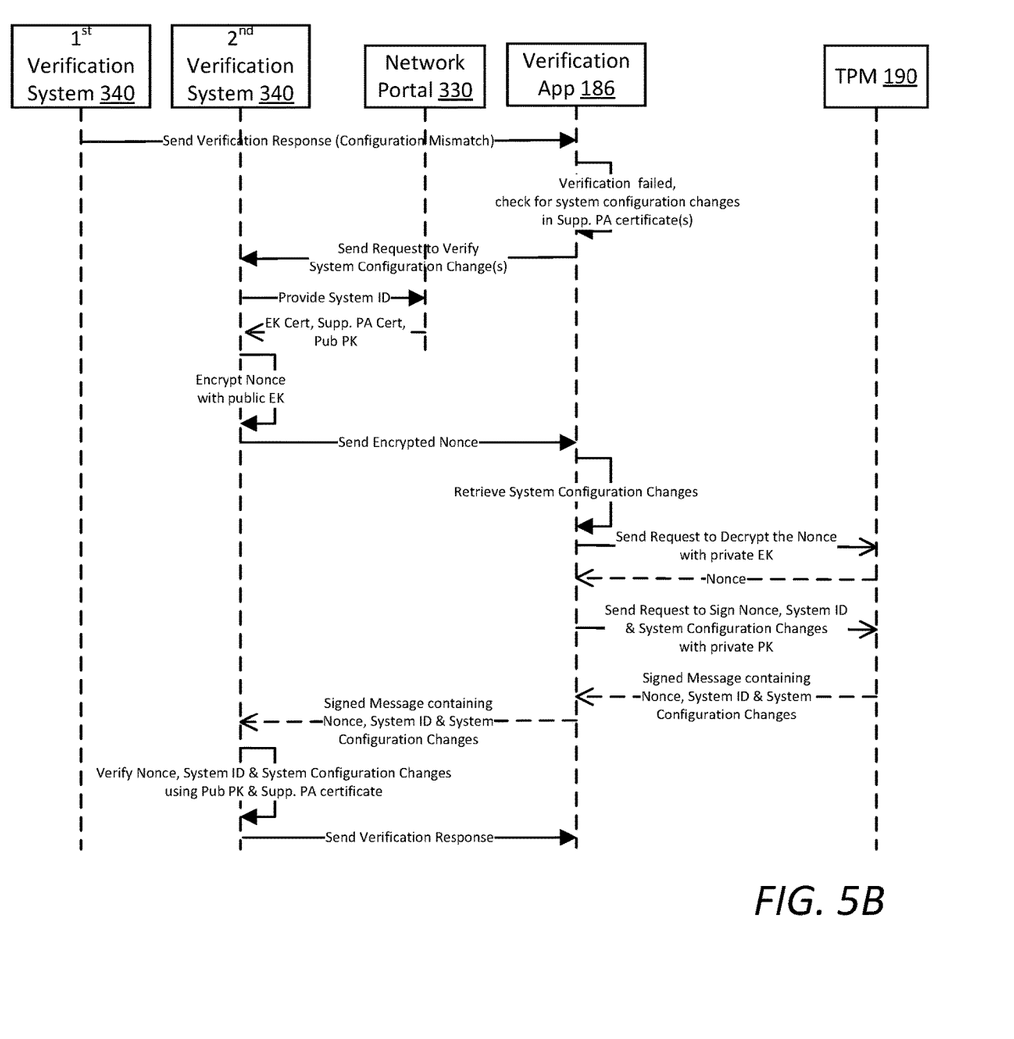

FIG. 3 illustrates one embodiment of a system that can be used to track and cryptographically verify system configuration and system configuration changes. FIGS. 4A and 4B illustrate example process flows that may be performed by components of the system shown in FIG. 3 to track an original system configuration of an IHS, as it was built by a manufacturing facility (FIG. 4A), and any changes made to the original system configuration after the IHS leaves the manufacturing facility (FIG. 4B). FIGS. 5A and 5B illustrate example process flows that may be performed by components of the system shown in FIG. 3 to cryptographically verify the original system configuration (FIG. 5A) any system configuration changes (FIG. 5B).

Systems and methods for tracking system configuration and system configuration changes are shown in FIGS. 3, 4A, and 4B. As shown in FIGS. 3 and 4A, an information handling system (such as IHS 100) may be built at a manufacturing facility 300. After the system motherboard is assembled, the trusted platform module (such as TPM 190) on the system motherboard may be used to generate a plurality of keys including, but not limited to, an Endorsement Key (EK) 214 and Platform Key (PK) 218. As noted above, EK 214 and PK 218 are asymmetric key pairs, each consisting of a public key and a private key. The public EK can be read from the TPM and included within an EK certificate, which may be stored within the TPM.

After an information handling system (such as IHS 100) is built according to ordered specifications, manufacturing test equipment can be used to read a unique system identifier ("system ID", such as a service tag, product ID, or ePPID) for the system, and one or more component identifiers (e.g., a vendor ID, device ID, serial number, etc.) for the hardware and/or software components, which were included within the system at the manufacturing facility 300. In some cases, the system ID and component identifiers may be read from system tables (e.g., SMBIOS or ACPI), or other system memory locations contained within the system. In some cases, one or more component identifiers may be read directly from the hardware component(s) contained within the system, for example, by reading memory mapped I/O, PCI configuration space or other memory locations contained therein. In addition to system ID and component identifiers, the manufacturing test equipment may read the EK certificate (containing the public EK) and the public PK stored within the TPM, as shown in FIG. 4A.

Once the system ID, component identifier(s), EK certificate and public PK are read from the system and stored within log files (see, FIG. 4A), manufacturing facility 300 may transmit the log files to a signing system 320 (e.g., a first signing system) via a network 202. As shown in FIGS. 3 and 4A, the signing system 320 extracts information from the log files and combines the system ID and component identifier(s) into an initial Platform Attribute (PA) certificate 322. After assembling and signing the initial PA certificate 322, the signing system 320 may store the initial PA certificate 322 and the certificate signing keys 324 used to sign the initial PA certificate, in some embodiments, before transmitting the initial PA certificate back to the manufacturing facility 300. Once received, manufacturing facility 300 stores the initial PA certificate 322 and the public PK in local storage 302. In some embodiments, the initial PA certificate 322 may also be transmitted to the IHS 100 and stored within the system (e.g., within certificates 184 stored within computer readable storage device 180 of IHS 100).

In some embodiments, manufacturing facility 300 may provide the EK certificate, the initial PA certificate and the public PK to a network portal 330, as shown in FIGS. 3 and 4A. In other embodiments, manufacturing facility 300 may only provide the EK certificate and the public PK to the network portal 330, and another remote system (e.g., a verification system 340) may use network portal 330 to retrieve the initial PA certificate 322 from the first signing system 320 as the initial PA certificate is created. After a user takes ownership of the system, the EK certificate, the initial PA certificate 322 and the public PK may be used to cryptographically verify the original system configuration (i.e., the configuration of the system built by the manufacturing facility 300), as shown in FIG. 5A and described in more detail below.

In general, signing system 320 is an information handling system (e.g., a server, hardware security module, etc.), which generates PA certificates 322 and (optionally) provides storage for the PA certificates 322 and the public and private certificate signing keys 324 used to sign the certificates. The signing system 320 is also a remote system, which is communicatively coupled to other remote systems via a network 202. In the embodiment shown in FIG. 3, signing system 320 is communicatively coupled to manufacturing facility 300, system modifier(s) 310 and verification system(s) 340 via network 202.

In some embodiments, a plurality of signing systems 320 may be used to generate PA certificates 322 and certificate signing keys 324. As shown in FIG. 4A, for example, a first signing system 320 communicatively coupled to manufacturing facility 300 may be used to generate an initial PA certificate 324 for a system using the system ID and component identifier(s) received from the manufacturing facility. If a system modifier 310 makes a change to the system configuration after the system leaves manufacturing facility 300, a second signing system 320 communicatively coupled to the system modifier 310 may be used to generate a supplemental PA certificate 324 for the system (see, FIG. 4B). However, the present disclosure is not restricted to a multiple signing system embodiment. In some embodiments, a single, centralized signing system 320 may be used by the manufacturing facility 300 and each of the system modifier(s) 310 to generate initial PA certificates and supplemental PA certificates.

As shown in FIGS. 3 and 4B, one or more system modifiers 310 may modify the system configuration after the system leaves manufacturing facility 300. If changes are made to the system configuration, the system ID and component identifiers are again read from system tables (e.g., SMBIOS or ACPI), other system memory locations, and/or directly from the hardware component(s) to identify system configuration changes. In addition, the public portion of the PK 218 may be read from the TPM. Once the system ID, component identifier(s), and public PK 218 are read from the system and stored within log files (see, FIG. 4B), system modifier 310 may transmit the log files to a signing system 320 via a network 202. The signing system 320 may be a second signing system associated with and communicatively coupled to the system modifier 310, as shown in FIG. 4B, or may be a centralized signing system used by the manufacturing facility 300 and all system modifier(s) 310.

As shown in FIGS. 3 and 4B, the signing system 320 extracts information from the log files and combines the system ID and component identifier(s) into a supplemental Platform Attribute (PA) certificate 322. In some embodiments, the supplemental PA certificate 322 may include the system ID and only the component identifier(s) that correspond to the system configuration changes made by the system modifier 310. For example, if the system modifier 310 adds a hard drive to the IHS, signing system 320 may generate a supplemental PA certificate 322 including the system ID and the component identifier(s) for the newly added hard drive.

After assembling and signing the supplemental PA certificate 322, signing system 320 may store the supplemental PA certificate 322 and the certificate signing keys 324 used to sign the supplemental PA certificate, in some embodiments, before transmitting the supplemental PA certificate 322 and the public certificate signing key 324 back to the system modifier 310. Once received, system modifier 310 stores the supplemental PA certificate 322 and the public certificate signing key 324 in local storage 312. In some embodiments, the supplemental PA certificate 322 may also be transmitted to IHS 100 and stored within the system (e.g., within certificates 184 stored within computer readable storage device 180 of IHS 100).

In some embodiments, system modifier 310 may provide the supplemental PA certificate 322 and the public PK 218 to network portal 330, as shown in FIGS. 3 and 4B. In other embodiments, another remote system (e.g., a verification system 340) may use network portal 330 to retrieve the supplemental PA certificate 322 from the signing system 320 as the supplemental PA certificate is created.

Once the system leaves the system modifier 310, the process flow shown in FIG. 4B may be repeated whenever configuration changes are made to the system by other system modifiers 310. Each time system configuration changes are made, a new supplemental PA certificate 322 is generated and stored to track the system configuration changes. After a user takes ownership of the system, the EK certificate, supplemental PA certificate(s) 322 and public PK 218 may be used to cryptographically verify the system configuration changes that were made to the system by the system modifier(s) 310.

Systems and related methods for cryptographically verifying system configuration and system configuration changes are shown in FIGS. 3, 5A, and 5B. After a user takes ownership of an information handling system (such as IHS 100), a system processing device (e.g., host processor 110) may execute program instructions (e.g., verification application 186) to cryptographically verify a current system configuration of the system. To initiate the verification process (see, FIG. 5A), the verification application 186 running on IHS 100 sends a verification request, via network 202, asking a remote system (e.g., a verification system 340) to verify a current system configuration of the IHS. A system identifier that uniquely identifies the IHS ("system ID", such as a service tag, product ID, or ePPID) may be included with the verification request, or may be sent along with the verification request to the verification system 340. In some embodiments, the verification request may be triggered by policy, or may be sent periodically and/or upon system start-up.

In general, verification system 340 is an information handling system (e.g., a server), which can be used to verify the configuration of information handling systems (e.g., desktop computers, laptop computers, tablets, servers, etc.) manufactured and/or built by manufacturing facility 300. The verification system 340 is also a remote system, which is communicatively coupled to other remote systems via a network 202. In the embodiment shown in FIG. 3, verification system 340 is communicatively coupled to IHS 100 and signing system(s) 320 via network 202. In some embodiments, a single, centralized verification system 340 may be used to verify the system configuration of IHS 100. In other embodiments, verification of system configuration may be performed by a plurality of verification systems 340. As described in more detail below, verification system 340 may generally include verification software 342 for verifying system configuration, and an encryption-decryption engine 344 for performing cryptographic functions.

Upon receiving a verification request from verification application 186, verification system 340 executes verification software 342 to retrieve information pertaining to the IHS, and use the retrieved information to verify a current system configuration of the IHS. In the embodiment shown in FIG. 5A, verification system 340 uses the system ID provided with the verification request to retrieve the EK certificate, initial PA certificate 322 and public PK 218 from network portal 330. Upon receiving such information, verification system 340 generates a nonce (e.g., a random number), uses the public EK contained with the EK certificate to encrypt the nonce, and sends the encrypted nonce to the IHS 100 via the network 202.

Upon receiving an encrypted nonce from verification system 340, verification application 186 retrieves the current system configuration of the IHS (e.g., from SMBIOS, ACPI, etc.), and sends a request to TPM 190 asking the TPM to decrypt the nonce using the private EK stored within the TPM. Upon receiving a decrypted nonce from TPM 190, verification application 186 sends another request to TPM 190 asking the TPM to sign the nonce, the system ID and the current system configuration using the private PK stored within the TPM. After receiving a signed message containing the nonce, the system ID and the current system configuration from TPM 190, verification application 186 transmits the signed message to verification system 340 for verification.

Upon receiving the signed message, verification system 340 uses the public PK and the initial PA certificate retrieved from network portal 330 to verify the nonce, the system ID and the current system configuration contained within the signed message. In some embodiments, verification system 340 uses the public PK to verify that: (a) the nonce contained within the signed message matches the nonce previously generated by the verification system 340, (b) the system ID contained within the signed message matches the system ID provided along with the verification request, and (c) the system configuration contained within the signed message matches the current system configuration specified in the initial PA certificate.

If a match exists for the nonce, the system ID and the system configuration, verification system 340 sends a verification response to verification application 186 confirming that the current system configuration retrieved by the verification application 186 matches the original system configuration of the IHS 100 (i.e., the configuration of the IHS as built by manufacturing facility 300). If the verification response confirms or verifies the current system configuration, verification application 186 may inform a user or administrator of the IHS 100 that the system configuration is correct and trustworthy. In some embodiments, verification system 340 may also grant IHS 100 an elevated level of trust, which may enable the IHS to perform trusted actions on behalf of the verification system, if the current system configuration is verified. Examples of trusted actions that may be performed on behalf of verification system 340 include, but are not limited to, locally collecting and transmitting telemetry data, and launching a trusted application to perform action(s) on behalf of the verification system.

If a match does not exist for the nonce, the system ID or the system configuration, verification system 340 sends a verification response to inform the verification application 186 that verification failed due to a configuration mismatch. In this case, a configuration mismatch occurs when the current system configuration does not match the original system configuration. If verification fails, verification application 186 may check for system configuration changes that may be stored, for example, in one or more supplemental PA certificates. For example, verification application 186 may send a query to verification system 340 to determine if any supplemental PA certificates were created for the IHS 100.

In one embodiment, the verification system 340 that performed the initial verification process (e.g., the first verification system 340 shown in FIGS. 5A and 5B) may tell the verification application 186 to contact another verification system 340 (e.g., the second verification system 340 shown in FIG. 5B) to check for supplemental PA certificate(s). Other embodiments may use a single, centralized verification system 340 to verify system configuration changes in lieu of the multiple verification system embodiment shown and described herein.

If verification application 186 determines that a supplemental PA certificate was created for the IHS 100, the verification application may send a second verification request to verification system 340 to verify the system configuration change(s) contained therein (see, FIG. 5B). As noted above, the system ID may be included with the second verification request, or may be sent along with the second verification request to the verification system 340.

Upon receiving the second verification request, verification system 340 executes verification software 342 to retrieve information pertaining to the IHS, and use the retrieved information to verify the system configuration changes. In the embodiment shown in FIG. 5B, verification system 340 uses the system ID to retrieve the EK certificate, supplemental PA certificate 322 and public PK 218 from network portal 330. Upon receiving such information, verification system 340 generates a nonce (e.g., a random number), uses the public EK contained with the EK certificate to encrypt the nonce, and sends the encrypted nonce to the IHS 100 via the network 202.

Upon receiving an encrypted nonce from verification system 340, verification application 186 retrieves system configuration change(s) made to the IHS (e.g., from SMBIOS, ACPI, etc.), and sends a request to TPM 190 asking the TPM to decrypt the nonce using the private EK stored within the TPM. Upon receiving a decrypted nonce from TPM 190, verification application 186 sends another request to TPM 190 asking the TPM to sign the nonce, the system ID and the system configuration change(s) using the private PK 218 stored within the TPM. After receiving a signed message containing the nonce, system ID and system configuration change(s) from TPM 190, verification application 186 transmits the signed message to verification system 340 for verification.

Upon receiving the signed message, verification system 340 uses the public PK 218 and the supplemental PA certificate 322 retrieved from network portal 330 to verify the nonce, the system ID and the system configuration change(s) contained within the signed message. In some embodiments, verification system 340 uses the public PK 218 to verify that: (a) the nonce contained within the signed message matches the nonce previously generated by the verification system 340, (b) the system ID contained within the signed message matches the system ID provided along with the second verification request, and (c) the system configuration change(s) contained within the signed message match the system configuration change(s) specified in the supplemental PA certificate.

If a match exists for the nonce, the system ID and the system configuration change(s), verification system 340 sends a verification response to verification application 186 confirming that the system configuration change(s) retrieved by the verification application 186 match the system configuration changes made by the system modifier(s) 310. If a verification response confirms or verifies the system configuration change(s), verification application 186 may inform a user or administrator of the IHS 100 that the system configuration is correct and trustworthy. As noted above, verification system 340 may also grant IHS 100 an elevated level of trust, which may enable the IHS to perform trusted actions on behalf of the verification system, if the system configuration change(s) are verified.

If a match does not exist for the nonce, the system ID or the system configuration change(s), verification system 340 may send a verification response informing the verification application 186 that verification again failed due to a configuration mismatch. In some embodiments, verification application 186 may check for additional system configuration changes in other supplemental PA certificates 322 if a configuration mismatch occurs. If the verification application 186 determines that additional supplemental PA certificate(s) 322 were created for the IHS 100, the process steps shown in FIG. 5B may be repeated to verify the system configuration change(s) contained therein.

However, if no additional supplemental PA certificate(s) 322 are found, verification application 186 may send an error message to the administrator or user of the IHS. In some embodiments, the error message may: (a) inform the administrator or user that the system configuration has changed, (b) provide details explaining how the system configuration has changed, and/or (c) ask the administrator or user to authorize the changes made to the system configuration. In some embodiments, IHS 100 may also be limited or restricted to a reduced level of trust by the verification system 340, if the system configuration changes cannot be verified. In addition or alternatively, verification system 340 may trigger one or more remedial actions to be taken, if the system configuration changes cannot be confirmed. Example remedial actions that may be taken if the system configuration changes cannot be confirmed include, but are not limited to, revoking user access to the IHS, deleting data or program code and/or limiting functionality of the IHS until the problem with the system configuration is resolved. Other actions may also be performed if system configuration cannot be confirmed.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

While the present disclosure may be adaptable to various modifications and alternative forms, specific embodiments have been shown by way of example and described herein. However, it should be understood that the present disclosure is not intended to be limited to the particular forms disclosed. Rather, the present disclosure is to cover all modifications, equivalents, and alternatives falling within the spirit and scope of the present disclosure as defined by the appended claims. Moreover, the different aspects of the disclosed systems and methods may be utilized in various combinations and/or independently. Thus, the present disclosure is not limited to only those combinations shown herein, but rather may include other combinations.

What is claimed is:

1. A system, comprising:
an information handling system (IHS) built by a manufacturing facility according to an original system configuration comprising hardware and/or software components included within the IHS at the manufacturing facility;
a first remote system coupled to the IHS via a network, wherein the first remote system comprises a first programmable integrated circuit that executes a first set of program instructions to track the original system configuration of the IHS, which identifies the hardware and/or software components included within the IHS at the manufacturing facility, and any changes made to the original system configuration after the IHS leaves the manufacturing facility, wherein the first programmable integrated circuit of the first remote system executes the first set of program instructions to track the original system configuration of the IHS by generating an initial platform attribute (PA) certificate containing information specifying the original system configuration; and
a second remote system coupled to the IHS and the first remote system via the network, wherein the second remote system comprises a second programmable integrated circuit that executes a second set of program instructions to verify a current system configuration of the IHS after a user takes ownership of the IHS;

wherein the IHS includes:
a trusted platform module (TPM) that stores a private and public Endorsement Key (EK), a private and public Platform Key (PK) and an EK certificate containing the public EK; and
a third programmable integrated circuit that executes a third set of program instructions to cryptographically verify the current system configuration of the IHS by communicating with the TPM and the second remote system.

2. The system as recited in claim 1, wherein the initial PA certificate includes a system identifier that uniquely identifies the IHS and a plurality of component identifiers that identify the hardware and/or software components included within the IHS at the manufacturing facility.

3. A system comprising:
an information handling system (IHS) built by a manufacturing facility according to an original system configuration;
a first remote system coupled to the IHS via a network, wherein the first remote system comprises a first programmable integrated circuit that executes a first set of program instructions to track the original system configuration of the IHS, and any changes made to the original system configuration after the IHS leaves the manufacturing facility;
wherein the first programmable integrated circuit executes the first set of program instructions to track the original system configuration of the IHS by generating an initial platform attribute (PA) certificate containing information specifying the original system configuration; and
wherein if a system configuration change is made to the original system configuration after the IHS leaves the manufacturing facility, the first programmable integrated circuit further executes the first set of program instructions to track the system configuration change by generating a supplemental PA certificate containing information specifying the system configuration change; and
a second remote system coupled to the IHS and the first remote system via the network, wherein the second remote system comprises a second programmable integrated circuit that executes a second set of program instructions to verify a current system configuration of the IHS after a user takes ownership of the IHS; and
wherein the IHS includes:
a trusted platform module (TPM) that stores a private and public Endorsement Key (EK), a private and public Platform Key (PK) and an EK certificate containing the public EK; and
a third programmable integrated circuit that executes a third set of program instructions to cryptographically verify the current system configuration of the IHS by communicating with the TPM and the second remote system.

4. The system as recited in claim 3, wherein the supplemental PA certificate includes a system identifier that uniquely identifies the IHS and one or more component identifiers that identify hardware and/or software components, which were added to the IHS after the IHS left the manufacturing facility.

5. The system as recited in claim 3, further comprising a network portal coupled to the IHS, the first remote system and the second remote system via the network, wherein:

the EK certificate, the initial PA certificate and the public PK are provided to the network portal before the IHS leaves the manufacturing facility; and
the supplemental PA certificate and the public PK are provided to the network portal, if the system configuration change is made to the original system configuration after the IHS leaves the manufacturing facility.

6. The system as recited in claim 5, wherein the third programmable integrated circuit of the IHS executes the third set of program instructions to initiate verification of the current system configuration by sending a first verification request to the second remote system, wherein the first verification request includes a system identifier that uniquely identifies the IHS.

7. The system as recited in claim 6, wherein upon receiving the first verification request, the second programmable integrated circuit of the second remote system executes the second set of program instructions to:
use the system identifier to retrieve the EK certificate, the initial PA certificate and the public PK from the network portal;
generate a first nonce;
encrypt the first nonce with the public EK obtained from the EK certificate; and
send the encrypted first nonce to the IHS.

8. The system as recited in claim 7, wherein upon receiving the encrypted first nonce from the second remote system, the third programmable integrated circuit of the IHS executes the third set of program instructions to:
send a first request to the TPM requesting the TPM to decrypt the encrypted first nonce using the private EK stored within the TPM;
retrieve the current system configuration of the IHS;
send a second request to the TPM requesting the TPM to sign the first nonce, the system identifier and the current system configuration using the private PK stored within the TPM; and
send a first signed message containing the first nonce, the system identifier and the current system configuration to the second remote system via the network.

9. The system as recited in claim 8, wherein upon receiving the first signed message, the second programmable integrated circuit of the second remote system executes the second set of program instructions to:
verify the first nonce, the system identifier and the current system configuration contained within the first signed message using the public PK and the initial PA certificate retrieved from the network portal; and
send a first verification response to the IHS via the network.

10. The system as recited in claim 9, wherein the first verification response confirms that the current system configuration matches the original system configuration if:
the first nonce contained within the first signed message matches the first nonce, which was generated by the second programmable integrated circuit of the second remote system upon receiving the verification request;
the system identifier contained within the first signed message matches the system identifier sent with the first verification request; and
the current system configuration contained within the first signed message matches the original system configuration specified in the initial PA certificate.

11. The system as recited in claim 9, wherein the first verification response informs the IHS that the current system configuration does not match the original system configuration if:

the first nonce contained within the first signed message does not match the first nonce, which was generated by the second programmable integrated circuit of the second remote system; or the system identifier contained within the first signed message does not match the system identifier sent with the first verification request; or the current system configuration contained within the first signed message does not match the original system configuration specified in the initial PA certificate.

12. The system as recited in claim 9, wherein if the first verification response informs the IHS that the current system configuration does not match the original system configuration, the third programmable integrated circuit of the IHS executes the third set of program instructions to determine if a supplemental PA certificate was generated for the IHS after the IHS left the manufacturing facility.

13. The system as recited in claim 12, wherein if the supplemental PA certificate was generated for the IHS, the third programmable integrated circuit of the IHS executes the third set of program instructions to send a second verification request to the second remote system to initiate verification of the system configuration change specified in the supplemental PA certificate, wherein the second verification request includes the system identifier that uniquely identifies the IHS.

14. The system as recited in claim 13, wherein upon receiving the second verification request, the second programmable integrated circuit of the second remote system executes the second set of program instructions to:

use the system identifier to retrieve the EK certificate, the supplemental PA certificate and the public PK from the network portal;

generate a second nonce;

encrypt the second nonce with the public EK obtained from the EK certificate; and send the encrypted second nonce to the IHS.

15. The system as recited in claim 14, wherein upon receiving the encrypted second nonce from the second remote system, the third programmable integrated circuit of the IHS executes the third set of program instructions to:

send a third request to the TPM requesting the TPM to decrypt the encrypted second nonce using the private EK stored within the TPM;

retrieve the system configuration change;

send a fourth request to the TPM requesting the TPM to sign the second nonce, the system identifier and the system configuration change using the private PK stored within the TPM; and send a second signed message containing the second nonce, the system identifier and the system configuration change to the second remote system via the network.

16. The system as recited in claim 15, wherein upon receiving the second signed message, the second programmable integrated circuit of the second remote system executes the second set of program instructions to:

verify the second nonce, the system identifier and the system configuration change contained within the second signed message using the public PK and the supplemental PA certificate retrieved from the network portal; and send a second verification response to the IHS via the network.

17. The system as recited in claim 16, wherein the second verification response confirms that the system configuration change retrieved by the third programmable integrated circuit of the IHS matches the system configuration change made to the original system configuration after the IHS leaves the manufacturing facility if:

the second nonce contained within the second signed message matches the second nonce, which was generated by the second programmable integrated circuit of the second remote system upon receiving the second verification request;

the system identifier contained within the second signed message matches the system identifier sent with the second verification request; and the system configuration change contained within the second signed message matches the system configuration change specified in the supplemental PA certificate.

18. The system as recited in claim 16, wherein the second verification response informs the IHS that the system configuration change retrieved by the third programmable integrated circuit of the IHS does not match the system configuration change made to the original system configuration after the IHS leaves the manufacturing facility if:

the second nonce contained within the second signed message does not match the second nonce, which was generated by the second programmable integrated circuit of the second remote system upon receiving the second verification request; or the system identifier contained within the second signed message does not match the system identifier sent with the second verification request; or the system configuration change contained within the second signed message does not match the system configuration change specified in the supplemental PA certificate.

* * * * *